US 008166185B2

(12) United States Patent
Samuel et al.

(10) Patent No.: US 8,166,185 B2
(45) Date of Patent: Apr. 24, 2012

(54) SYSTEM AND METHOD FOR ENTERPRISE SOFTWARE DISTRIBUTION

(75) Inventors: Subodh A. Samuel, Richardson, TX (US); Raji Abraham, Southlake, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 3349 days.

(21) Appl. No.: 10/092,181

(22) Filed: Mar. 5, 2002

(65) Prior Publication Data

US 2005/0144298 A1    Jun. 30, 2005

(51) Int. Cl.
*G06F 15/16* (2006.01)

(52) U.S. Cl. ........ 709/230; 709/217; 709/220; 709/222; 709/238

(58) Field of Classification Search .......... 709/223–224, 709/238, 217–219, 241, 230, 220, 222
See application file for complete search history.

(56) References Cited

U.S. PATENT DOCUMENTS

| | | | |
|---|---|---|---|
| 4,780,821 A | 10/1988 | Crossley | 364/200 |
| 4,853,843 A | 8/1989 | Ecklund | |
| 4,951,192 A | 8/1990 | Chase, Jr. et al. | 364/200 |
| 5,247,683 A | 9/1993 | Holmes et al. | 395/700 |
| 5,263,164 A | 11/1993 | Kannady et al. | 395/700 |
| 5,282,273 A | 1/1994 | Ushio et al. | 395/325 |
| 5,339,435 A | 8/1994 | Lubkin et al. | 717/121 |
| 5,581,764 A | 12/1996 | Fitzgerald et al. | 395/703 |
| 5,678,041 A | 10/1997 | Baker et al. | 707/9 |
| 5,857,072 A * | 1/1999 | Crowle | 709/203 |
| 5,867,714 A | 2/1999 | Todd et al. | |
| 5,909,581 A | 6/1999 | Park | 717/170 |
| 5,919,247 A | 7/1999 | Van Hoff et al. | 709/217 |
| 5,920,701 A * | 7/1999 | Miller et al. | 709/228 |
| 5,950,010 A | 9/1999 | Hesse et al. | 717/178 |
| 6,085,188 A | 7/2000 | Bachmann et al. | 707/3 |
| 6,119,122 A | 9/2000 | Bunnell | 707/102 |
| 6,131,120 A | 10/2000 | Reid | 709/225 |
| 6,138,153 A | 10/2000 | Collins et al. | 709/221 |
| 6,195,794 B1 | 2/2001 | Buxton | 717/108 |
| 6,205,579 B1 | 3/2001 | Southgate | 707/203 |
| 6,223,210 B1 * | 4/2001 | Hickey | 709/203 |
| 6,226,784 B1 | 5/2001 | Holmes et al. | 717/100 |
| 6,226,788 B1 | 5/2001 | Schoening et al. | 717/107 |

(Continued)

FOREIGN PATENT DOCUMENTS

WO    WO 91/02313    2/1991

(Continued)

OTHER PUBLICATIONS

Shi et al., An enterprise directory solution with DB2, 2000, IBM Systems Journal, vol. 39, No. 2, pp. 360-383.

(Continued)

*Primary Examiner* — Lan-Dai Truong

(57) ABSTRACT

A method for distributing software is provided. The method includes distributing a message from an application server to one or more application layer routers, such as servers that are being used to route enterprise software distribution messages, using a modified publish and subscribe architecture that includes the route to all recipients in the message address and that uses existing network communications. The message can thus be distributed to one or more subscribers on a first channel. The message is then distributed to one or more subscribers using the modified publish and subscribe architecture on one or more second channels selected from a second channel layer if necessary. This process is repeated until the message reaches all subscribers listed as recipients in the message.

17 Claims, 11 Drawing Sheets

U.S. PATENT DOCUMENTS

| | | | |
|---|---|---|---|
| 6,324,543 B1 | 11/2001 | Cohen et al. | |
| 6,347,312 B1 | 2/2002 | Byrne et al. | 707/3 |
| 6,349,307 B1 * | 2/2002 | Chen | 707/103 X |
| 6,367,077 B1 | 4/2002 | Brodersen et al. | 717/170 |
| 6,397,378 B1 | 5/2002 | Grey et al. | 717/175 |
| 6,405,364 B1 | 6/2002 | Bowman-Amuah | 717/101 |
| 6,418,554 B1 | 7/2002 | Delo et al. | 717/170 |
| 6,490,722 B1 | 12/2002 | Barton et al. | |
| 6,493,341 B1 * | 12/2002 | Datta et al. | 370/392 |
| 6,493,870 B1 | 12/2002 | Madany et al. | 717/165 |
| 6,564,369 B1 | 5/2003 | Hove et al. | 717/121 |
| 6,615,166 B1 | 9/2003 | Guheen et al. | 703/27 |
| 6,640,317 B1 | 10/2003 | Snow | 714/38 |
| 6,651,248 B1 | 11/2003 | Alpern | |
| 6,687,731 B1 * | 2/2004 | Kavak | 718/105 |
| 6,744,450 B1 | 6/2004 | Zimniewicz et al. | |
| 6,757,698 B2 | 6/2004 | McBride et al. | |
| 6,816,903 B1 * | 11/2004 | Rakoshitz et al. | 709/226 |
| 6,834,301 B1 | 12/2004 | Hanchett | 709/223 |
| 6,847,827 B2 * | 1/2005 | Helm et al. | 455/509 |
| 6,907,011 B1 * | 6/2005 | Miller et al. | 370/254 |
| 6,944,135 B2 * | 9/2005 | Novaes | 370/256 |
| 6,961,319 B2 * | 11/2005 | Novaes | 370/256 |
| 7,020,717 B1 * | 3/2006 | Kovarik et al. | 709/238 |
| 2001/0034733 A1 | 10/2001 | Prompt et al. | 707/102 |
| 2001/0037339 A1 | 11/2001 | Harvey | 707/102 |
| 2002/0010700 A1 | 1/2002 | Wotring et al. | 707/100 |
| 2002/0113816 A1 | 8/2002 | Mitchell et al. | 345/734 |
| 2003/0009434 A1 | 1/2003 | Munn et al. | 707/1 |
| 2003/0055935 A1 | 3/2003 | Tarrant et al. | 709/223 |

FOREIGN PATENT DOCUMENTS

| | | |
|---|---|---|
| WO | WO 93/04426 | 3/1993 |

OTHER PUBLICATIONS

Alexander, et al., System and Method for Integrating Software Management and Distribution, U.S. Patent Application filed on Nov. 5, 1999, U.S. Appl. No. 09/435,300, pp. 1-45.

Richard S. Hall, Dennis Heimbigner, and Alexander L. Wolf, A Cooperative Approach to Support Software Deployment Using the Software Dock, Software Engineering Research Laboratory, University of Colorado, Software Engineering, 1999, pp. 1-10.

IBM Corporation, An Integrated Method for Installing Non-Integrated Software, IBM TDB Journal, Apr. 1998 [retrieved], retrieved from Software Patent Institute Database, pp. 1-9, (full text).

IBM Corporation, Internet Installation of Software Updates using a Web Browser, IBM TDB Journal, Nov. 1996 [retrieved Mar. 21, 2002], retrieved from Software Patent Institute Database, pp. 1-6 (full text).

InstallShield Software Corp. Ships InstallShield Express2.1, Business Wire, New York, Nov. 9, 1998 [retrieved Mar. 22, 2002], retrieved from ProQuest Data Base, pp. 1-4.

IEEE Spectrum, Apr. 1992, L. Brooks Hickerson et al., Managing Networked Workstations, pp. 55, 56, and 58.

ICL Technical Journal, vol. 7, No. 4, Nov. 1991, Oxford, GB, XP000268112, P. Barthram et al., Distribution Management—ICL's Open Approach, pp. 701-717.

ICL Technical Journal, vol. 7, No. 4, Nov. 1991, Oxford, GB, XP000268110, T. Gale, The Evolution Within ICL of an Architecture for Systems Management, pp. 673,685.

IBM Technical Disclosure Bulletin, vol. 32, No. 10A, Mar. 1990, Armonk, US Reference Monitor—Location of Resource Access, p. 335.

1998 IEEE, Carl W. Symborski, Updating Software and Configuration Data in a Distributed Communications Network, pp. 331-337.

* cited by examiner

SYSTEM AND METHOD FOR ENTERPRISE SOFTWARE DISTRIBUTION

RELATED APPLICATIONS

This application is related to U.S. Ser. No. 09/435,300, entitled "System and Method for Integrating Software Management and Distribution," filed Nov. 5, 1999.

FIELD OF THE INVENTION

The present invention pertains to the field of software distribution. More specifically, the invention relates to a system and method for enterprise software distribution that uses optimized messaging to efficiently use enterprise network bandwidth and resources.

BACKGROUND OF THE INVENTION

Systems for enterprise software distribution are known in the art. For example, it is known to prepackage suites of software for distribution over an existing enterprise network, such as a local area network, a wide area network, or a combination of such networks. The prepackaged software is then installed on one or more preselected workstations, such as by using a point-to-point message protocol, a broadcast protocol, or a publish and subscribe message protocol.

Many problems have been encountered with such software distribution schemes. One problem is that enterprise network resources are unable to support the distribution of software in a timely manner using point-to-point message protocols for very large networks, such as those with over 1000 nodes. In such networks, even a five minute distribution time per node will require almost one week of time to complete software distribution for the enterprise. As a result, such systems must have multiple distribution points, which must each be configured and coordinated.

Broadcast of software packages to multiple endpoints can alleviate network bandwidth and resource requirements, but because of the differences between workstation hardware, software, physical location, user needs, and other configuration variables, such broadcast distribution typically requires operator support and configuration at each workstation.

Publish and subscribe messaging can be used to improve the ability to control software distribution to endpoints based on their location and function, but such publish and subscribe messaging requires that all the endpoints subscribe to a single channel, which results in some endpoints receiving messages that are not needed, and which also unnecessarily increases the number of messages that have to be handled by the enterprise network. Further, the publish/subscribe model and the centralized software distribution model have two opposing requirements. In the publish/subscribe model, the publisher does not care who the subscriber is. It is the subscriber's responsibility to subscribe to the "channel of interest". In the centralized mode, the publisher of the software decides who should subscribe to the software distribution.

SUMMARY OF THE INVENTION

In accordance with the present invention, a system and method for enterprise distribution of software are provided that overcome known problems with systems and methods for distributing software in an enterprise.

In particular, a system and method for enterprise distribution of software are provided that uses a modified publish and subscribe messaging that does not require all end points in the enterprise to subscribe to a single common channel, thereby eliminating the flow of unwanted messages through out an enterprise's network.

In accordance with an exemplary embodiment of the present invention, a method for distributing software is provided. The method includes distributing a message from an application server to one or more application layer routers, such as servers that are being used to route enterprise software distribution messages, using a modified publish and subscribe architecture that includes the route to all recipients of that message in the message address and that uses existing network communications. The message can thus be distributed to one or more subscribers on a first channel. The message is then distributed to one or more subscribers using the modified publish and subscribe architecture on one or more second channels selected from a second channel layer if necessary. This process can be repeated as necessary to optimize the delivery of messages to all subscribers while minimizing the use of enterprise network resources.

The present invention provides many important technical advantages. One important technical advantage of the present invention is a system and method for enterprise software distribution that uses modified publish and subscribe messaging to transmit messaging including files and control data to endpoints. The modified publish and subscribe messaging optimizes the use of bandwidth and resources, and allows the messages that are needed at each node to be determined and sequenced at a centralized location, without the need for a receiving system operating on each node, such as one that must subscribe to multiple channels depending on an endpoint's function or the set of software applications that it is required to have.

Those skilled in the art will further appreciate the advantages and superior features of the invention together with other important aspects thereof on reading the detailed description that follows in conjunction with the drawings.

DETAILED DESCRIPTION OF THE INVENTION

Figure 1:
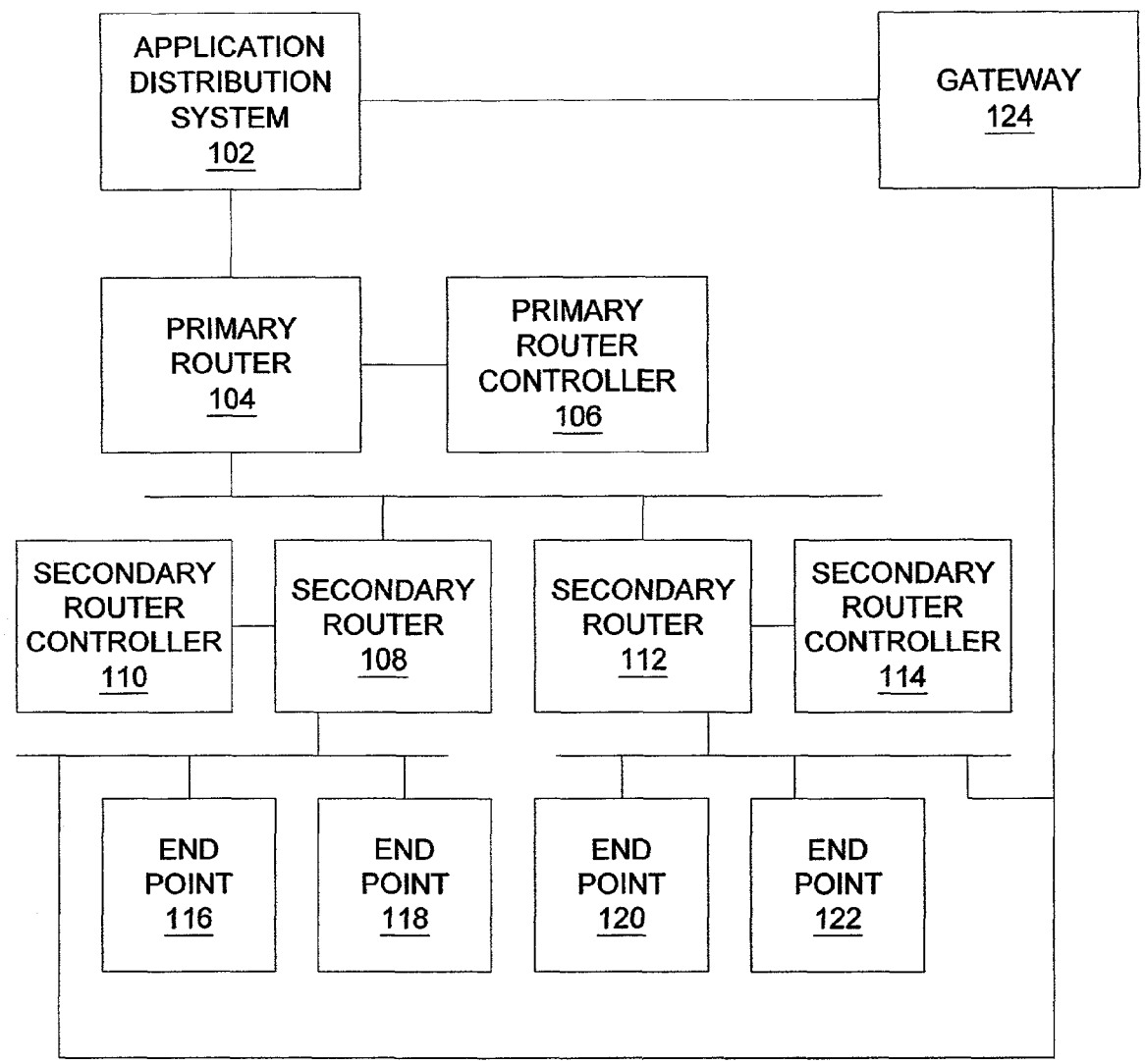
FIG. 1 is a diagram of a system for distributing software in accordance with an exemplary embodiment of the present invention.

In the description that follows, like parts are marked throughout the specification and drawings with the same reference numerals, respectively. The drawing figures might not be to scale, and certain components can be shown in generalized or schematic form and identified by commercial designations in the interest of clarity and conciseness.

FIG. 1 is a diagram of a system 100 for distributing software in accordance with an exemplary embodiment of the present invention. System 100 can be used to efficiently distribute software in a very large enterprise, such as to thousands of geographically distributed workstations or nodes from a single distribution point.

System 100 includes application distribution system 102, which can be implemented in hardware, software, or a suitable combination of hardware and software, and which can be one or more software systems operating on a general purpose server platform. As used herein, a software system can include one or more objects, agents, lines of code, threads, subroutines, databases, application programming interfaces (APIs), web browser plug-ins, or other suitable data structures, source code (human readable), object code (machine readable), and can include two or more different lines of code or suitable data structures operating in two or more separate software applications, on two or more different processing platforms, or in other suitable architectures. In one exemplary embodiment, a software system can include one or more lines of code or other suitable software structures operating in a general purpose software application, such as an operating system, and one or more lines of code or other suitable software structures operating in a specific purpose software application. In another exemplary embodiment, a software system can be implemented as a distributed software system, on a different processing platform than that shown in the exemplary embodiments herein, or in other suitable manners.

Application distribution system 102 is used to distribute packages of software that have been assembled for installation on an endpoint, such as using an assembly system and method described in U.S. Ser. No. 09/435,300, entitled "System and Method for Integrating Software Management and Distribution," filed Nov. 5, 1999, which is hereby incorporated by reference for all purposes. An endpoint can be a suitable processor platform, such as a laptop computer, a desktop computer, a workstation, a handheld device, a peripheral component such as a scanner, a printer, a copy machine, a fax machine or other suitable systems having a processor and processing capabilities.

Application distribution system 102 is coupled to primary router 104. As used herein, the term "couple," and its cognate terms such as "couples" and "coupled," can include a physical connection (such as through a copper conductor), a virtual connection (such as through randomly assigned memory locations of a data memory device), a logical connection (such as through one or more logical devices of a semiconducting circuit), a hypertext transfer protocol connection, other suitable connections, or a suitable combination of such connections. In one exemplary embodiment, systems and components are coupled to other systems and components through intervening systems and components, such as through an operating system of a general purpose server platform.

Application distribution system 102 provides files to primary router 104 for distribution to a plurality of endpoints. Application distribution system 102 coordinates the transmission of files used for configuring the software applications so that the distribution of the software applications to the endpoints is optimized. Primary router 104 is used to distribute the files as a plurality of messages in a modified publish and subscribe format, where the address for each message is assigned by application distribution system 102 based on the location of the endpoints.

Primary router 104 can be implemented in hardware, software, or a suitable combination of hardware and software, and can be one or more software systems operating on a general purpose server platform. Primary router 104 is an application layer router, as opposed to a hardware layer router. In one exemplary embodiment, in the Open Systems Interconnection (OSI) networking model, an application layer router would operate in layer 7 of the OSI model, whereas a physical layer router would operate in layer 1 of the OSI model. Thus, primary router 104 can operate on a suitable network node that is normally not used for software distribution, such as a server, a workstation, or other suitable processing platforms. In this manner, primary router 104 can be selected based on an optimal network architecture, as opposed to using an existing hardware layer router that may not be optimally located for distribution of software in an enterprise.

Primary router controller 106 is coupled to primary router 104, and performs control of primary router 104. In one exemplary embodiment, primary router controller 106 can be implemented in hardware, software, or a suitable combination of hardware and software, and can be one or more software systems operating on a general purpose server platform. Primary router controller 106 receives messages from primary router 104 and stores the messages for subsequent transmission to other nodes in the distribution system. In one exemplary embodiment, primary router controller 106 stores messages that include one or more files, and then provides the messages to primary router 104 for transmission at predetermined times, upon the occurrence of predetermined events, or in other suitable manners. The processor resources of primary router 104 can thus be optimized, so as to facilitate rapid distribution of software throughout the enterprise from a centralized location.

Primary router 104 is coupled to secondary router 108 and secondary router 112, such as through a network. Secondary router 108, secondary router 112, secondary router controller 110 and secondary router controller 114 can each be implemented in a manner similar or identical to that of primary router 104 and primary router controller 106, respectively. Secondary router 108 and secondary router 112 receive messages containing files for distribution to endpoints from primary router 104. The messages are addressed and distributed in a modified publish and subscribe process that uses the connection between secondary router 108 and primary router 104 as a first channel, and the connection between secondary router 112 and primary router 104 as a second channel. In this manner, primary router 104 distributes messages to secondary router 108 and secondary router 112 by posting those messages to the corresponding channel. Thus, files to be distributed through primary router 104 and secondary router 108 and secondary router 112 can be addressed using a conventional publish and subscribe process where the message is addressed by identifying the channel to which the message should be routed, but where the "subscription" process is performed using standard network messaging functions.

Secondary router controller 110 and secondary router controller 114 are used to store and process the messages and files as they are received, so that the messages and files can then be routed through secondary router 108 and secondary router 112, respectively, in accordance with router processor capacity, bandwidth of the communications media, at predetermined times, or in response to predetermined events.

Secondary router 108 is coupled to endpoint 116 and endpoint 118, and secondary router 112 is coupled to endpoint 120 and endpoint 122, such as by a single network connection, two network connections as shown, or other suitable communications media. Files are transmitted in the form of messages from secondary router 108 to endpoints 116 and 118, and from secondary router 112 to endpoints 120 and 122, such as upon receipt of notification of a predetermined event, after the expiration of a period of time, or in accordance with other suitable routing commands. In addition, the addressing of messages from secondary router 108 to endpoint 116 and endpoint 118 is performed by using a modified publish and subscribe message format. In this manner, application distribution system 102 can address files for distribution to endpoints 116 through 122 by identifying the first channel to secondary router 108 or secondary router 112, and the second channel to the endpoint, where the existing network messaging software is used to install the files on the endpoints from the secondary routers. Thus, system 100 uses a modified publish and subscribe message format to distribute software in an enterprise, so as to deploy software systems on a large number of endpoints. System 100 allows the transmission of large numbers and sizes of files over application layer routers and communications media that does not overload the processor capabilities of the routers, and that does not overload the bandwidth of the communications media. In this manner, application distribution system 102 can sequence the distribution of files in a manner that optimizes existing system architecture.

Gateway 124 can be implemented in hardware, software, or a suitable combination of hardware and software, can be one or more software systems operating on a general purpose server platform. In on exemplary embodiment, gateway 124 is an existing server node in a network that is used as an application layer gateway for the purpose of facilitating enterprise software distribution. The enterprise software distribution process may require response messages to be generated by endpoints 116 through 122 and transmitted back to application distribution system 102 or other suitable systems. Gateway 124 can be used to return messages in response to event notification messages or other data transmitted through primary router 104 to secondary routers 108 or 112 so as to trigger subsequent transmission of messages to endpoints 116 and 122. Gateway 124 is coupled to endpoints 116 through 122, such as through the network connection between secondary routers 108 and secondary router 112, or by other suitable means. Thus, gateway 124 can be used to receive and coordinate message transmissions from endpoints 116 through 122 to application distribution system 102 or other suitable systems.

In operation, system 100 can be used to distribute software in an enterprise that includes a large number of nodes in geographically disbursed areas. System 100 allows software to be transmitted to each node using modified publish and subscribe messaging that uses existing network communications systems and allows file transmission to be coordinated through timing, in response to events, and to optimize the use of application layer router processing capabilities and bandwidth of network connections. In this manner, application distribution system 102 can determine an optimal processor and bandwidth loading based on the distribution of software to endpoints, and can further address files for distribution to endpoints in a manner that does not require those files to be individually addressed, broadcast, or that does not require the endpoints to determine the files that are needed and to subscribe to channels to receive such files. In this manner, application distribution system 102 can provide a sequence of file distribution based on optimized routing practices, such as by transmitting messages to endpoints to determine configuration information and then sequencing specific software to endpoints based on geographical, functional, or other parameters and network bandwidth and resources.

Figure 2:
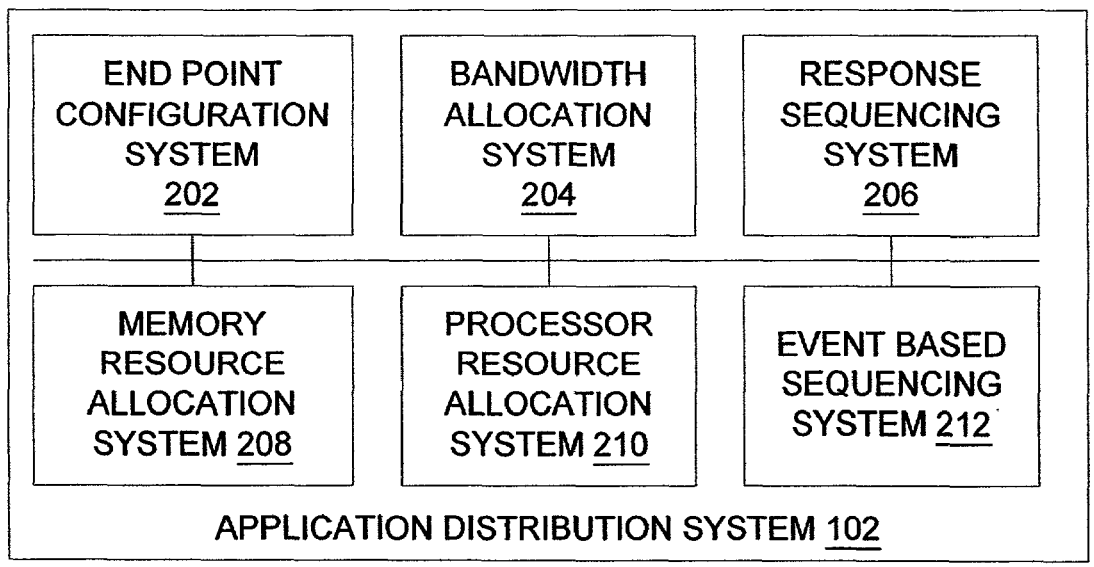
FIG. 2 is a diagram of a system for distributing applications in an enterprise in accordance with an exemplary embodiment of the present invention.

FIG. 2 is a diagram of a system 200 for distributing applications in an enterprise in accordance with an exemplary embodiment of the present invention. System 200 includes application distribution system 102 and endpoint configuration system 202, bandwidth allocation system 204, response sequencing system 206, memory resource allocation system 208, processor resource allocation system 210 and event based sequencing system 212, each of which can be implemented in hardware, software, or a suitable combination of hardware and software, and which can be one or more software systems operating on a general purpose server platform.

Endpoint configuration system 202 includes endpoint configuration data for a plurality of endpoints in an enterprise. In one exemplary embodiment, endpoint configuration system 202 can include a database of processor configuration data that identifies the location of each processor, the applications that are required for each processor, the groups to which the processor operators are assigned, processors having multiple operators, and other suitable information. This processor configuration data is used by endpoint configuration system 202 to identify software that should be transmitted to each endpoint in an enterprise software distribution event. Furthermore, the endpoint configuration data can be used to identify optional messages for each endpoint, including negative options that require the endpoint to delete file files that were broadcast to all endpoints, all endpoints in a predetermined class, or other suitable systems. In this manner, endpoints having unique requirements that can be addressed by the deletion of certain files can be readily accommodated by sequencing optional messages that require file deletion, optional messages containing additional files, or other suitable data.

Bandwidth allocation system 204 receives message routing data and provides bandwidth allocation data in response to the message routing data. In one exemplary embodiment, bandwidth allocation system 204 tracks bandwidth availability for a software distribution path based on message routing data, such as using modified publish and subscribe routing in which each channel required to transmit a message to an endpoint is contained in the address for the message, in addition to the total number of endpoints that will be receiving the message. Bandwidth allocation system 204 can generate bandwidth availability data, such as in response to a query from application distribution system 102 or other suitable systems, so as to allow such other systems to sequence messages accordingly. Likewise, bandwidth allocation system 204 can receive message data that includes priority data, and can sequence the messages based upon available bandwidth and message routing data contained in the modified publish and subscribe format.

Response sequencing system 206 receives message routing data and provides response sequencing data in response to the message routing data. In one exemplary embodiment, response sequencing system 206 tracks bandwidth availability for a response message path based on message routing data, such as by determining the maximum response message load that can be generated when a plurality of endpoints generate a response to a transmitted message. Response sequencing system 206 can determine bandwidth availability or processor capacity data, and can provide a time, event, or priority ranking for transmitted messages to ensure that the response messages can be transmitted to the required destination.

Memory resource allocation system 208 receives message routing data and provides memory resource allocation data in response to the message routing data. In one exemplary embodiment, memory resource allocation system 208 tracks memory resource availability for a software distribution path based on message routing data, such as using modified publish and subscribe routing in which messages need to be stored at application routers in response to bandwidth availability or other variables. Memory resource allocation system 208 can generate memory resource availability data, such as in response to a query from application distribution system 102 or other suitable systems, so as to allow such other systems to sequence messages accordingly. Likewise, memory resource allocation system 208 can receive message data that includes priority data, and can sequence the messages based upon available memory resources and message routing data contained in the modified publish and subscribe format.

Processor resource allocation system 210 receives message routing data and provides processor resource allocation data in response to the message routing data. In one exemplary embodiment, processor resource allocation system 210 tracks processor resource availability for a software distribution path based on message routing data, such as using modified publish and subscribe routing in which each channel required to transmit a message to an endpoint is contained in the address for the message, in addition to the total number of endpoints that will be receiving the message. Processor resource allocation system 210 can generate processor resource availability data, such as in response to a query from application distribution system 102 or other suitable systems, so as to allow such other systems to sequence messages accordingly. Likewise, processor resource allocation system 210 can receive message data that includes priority data, and can sequence the messages based upon available processor resources and message routing data contained in a modified publish and subscribe format.

Event based sequencing system 212 generates event based sequencing control data for inclusion in a message. In one exemplary embodiment, event based sequencing system 212 can determine whether the occurrence of an event is required prior to transmitting a message. For example, receipt of a "WakeOnLAN" message may be required before files are transmitted, or receipt of a first file may be required prior to transmission of a second file. Event based sequencing system 212 can include event confirmation control data that requires receipt of confirmation data from application distribution system 102, nodes, or other system components before transmitting a message. Likewise, event based sequence system 212 can receive event notification from systems operating on a router or router controller, such as timer systems, bandwidth availability monitors, processor loading monitors or other suitable systems.

In operation, system 200 allows files to be organized as messages, and messages to be sequenced for distribution to a plurality of processors in an enterprise. System 200 allows the distribution of files to be organized so that files are transmitted in accordance with optimal bandwidth allocation, optimal memory resource allocation, optimal processor resource allocation, optimal response sequencing allocation for response gateways or other response systems, and optimal event based sequencing. System 200 thus allows files to be sequenced so as to facilitate file distribution in an optimal time period.

Figure 3:
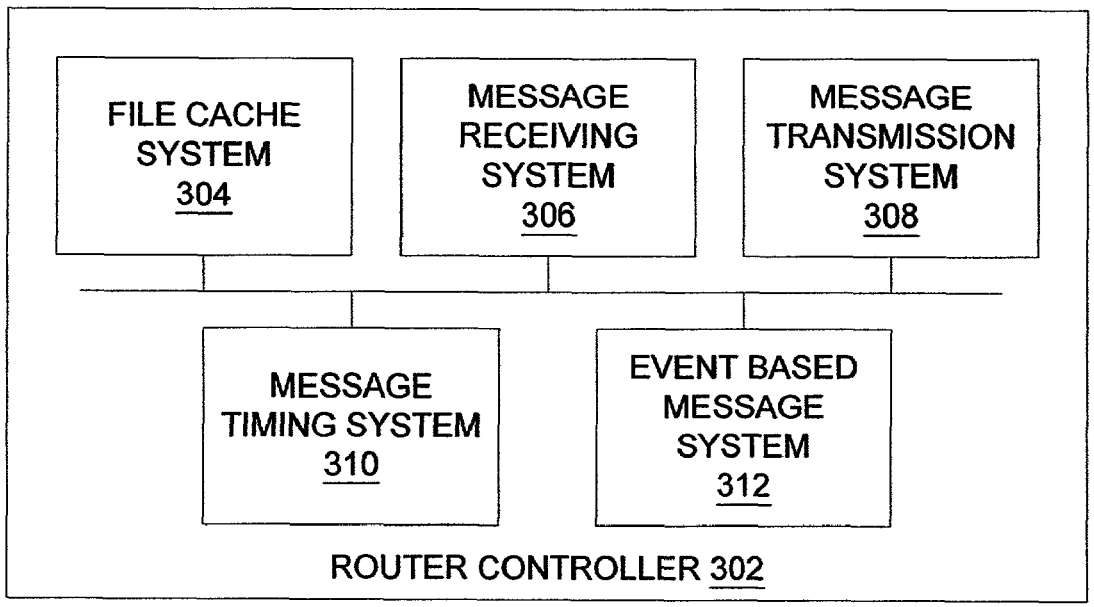
FIG. 3 is a diagram of a system for controlling an application layer router in accordance with an exemplary embodiment of the present invention.

FIG. 3 is a diagram of a system 300 for controlling an application layer router in accordance with an exemplary embodiment of the present invention. System 300 includes router controller 302 and file cache system 304, message receiving system 306, message transmission system 308, message timing system 310 and event based message system 312, each of which can be implemented in hardware, software, or a suitable combination of hardware and software, and which can be one or more software systems operating on a general purpose server platform.

File cache system 304 receives messages including one or more files and stores the messages for subsequent transmission to one or more endpoints. File cache system 304 can store the messages in a random access memory, a magnetic storage media, or other suitable storage media based on the expected amount of time that a given file will be stored. In one exemplary embodiment, file cache system 304 can determine whether a file will be stored for a predetermined amount of time or until an event occurs, and can store the file in a storage medium based upon the expected amount of storage time for the file.

Message receiving system 306 receives messages including routing data such as publish and subscribe distribution data and payload data that can include files for distribution and corresponding control data, event messages that are used to trigger event based message distribution (such as timing messages, processor availability messages, bandwidth availability messages, or other suitable messages), and other suitable payload data. Message receiving system 306 then performs a message preparation function on the message. In one exemplary embodiment, a message preparation function can include extracting payload data for processing by message timing system 310, event based message system 312, or other suitable systems, preparing the message for retransmission to another router through message transmission system 308, or other suitable message preparation functions.

Message transmission system 308 assembles address data and payload data into a message for transmission by a router. In one exemplary embodiment, the message transmission system 308 can assemble files into payload data and append publish and subscribe address data based on control data received from message timing system 310, event based message system 312, message receiving system 306, or other suitable systems. In another exemplary embodiment, message transmission system 308 can transmit data to another router or router controller, such as bandwidth availability data, processor capacity data or other suitable messages.

Message timing system 310 performs timing functions for distribution of messages. Message timing system 310 can sequence messages in accordance with timing control data associated with each message, can start one or more timers based on receipt of messages with associated timer control data, and can perform other suitable functions.

Event based message system 312 tracks messages with event based transmission functions and generates message transmission control data upon the occurrence of an event. In one exemplary embodiment, event based message system 312 can store a list or other suitable structures with the events, and can monitor event messaging to determine whether an event has occurred. In another exemplary embodiment, event based message system 312 can perform queries or other suitable functions to determine whether an event has occurred. Event based message system 312 can further compile files and other data into a message to be transmitted upon the occurrence of an event.

In operation, system 300 provides control for an application layer router in a software distribution system for an enterprise. System 300 allows modified publish and subscribe messaging to be used to distribute messages in an enterprise software distribution system, in which messages are published based upon priority, time, bandwidth capacity, processor capacity, events, or other occurrences. System 300 thus allows the existing network to be used in an enterprise to distribute software to a plurality of endpoints in a manner that optimizes the software distribution process.

Figure 4:
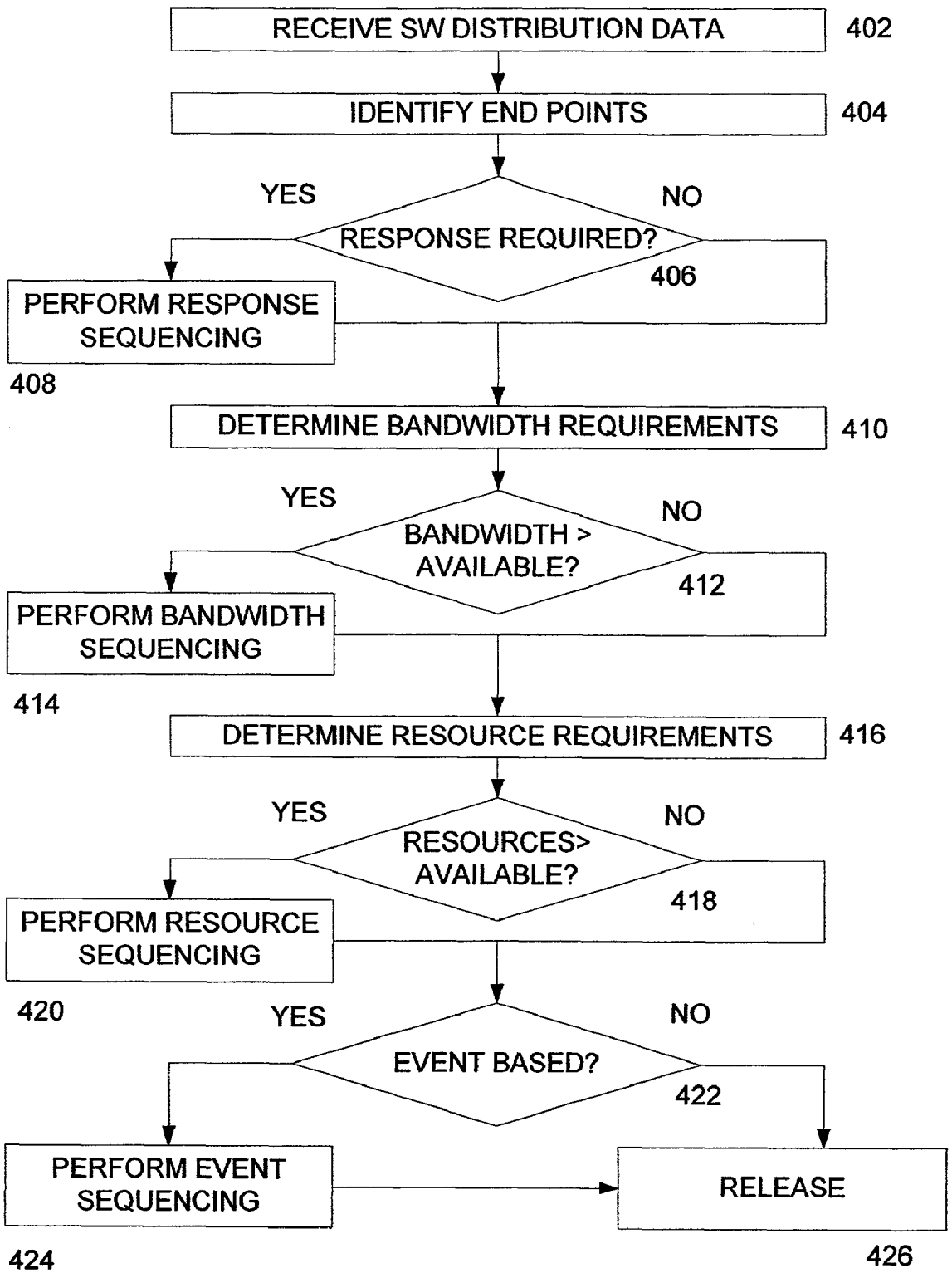
FIG. 4 is a flowchart of a method for distributing software using modified publish and subscribe messaging, in accordance with an exemplary embodiment of the present invention.

FIG. 4 is a flowchart of a method 400 for distributing software using modified publish and subscribe messaging, in accordance with an exemplary embodiment of the present invention. Method 400 allows messages to be sequenced based upon resources, bandwidth, responses, or events.

Method 400 begins at 402, where software distribution data is received. In one exemplary embodiment, the software distribution data can include data identifying suites of software to be distributed, where the suites further comprise a plurality of software components, where each component includes a plurality of files. Likewise, the software distribution data can identify classes of machines that should receive different software suites and components based upon the function of the node, the location of a node, the geographic location of a node, the location of a node within an organization, or other suitable functions. The method then proceeds to 404.

At 404, the endpoints associated with the software distribution data are identified. In one exemplary embodiment, endpoints can be classed based upon various geographical data, organizational data, functional data, or other suitable data, where the network address for the endpoint is correlated based on these various factors. After the endpoints are identified, the method proceeds to 406.

At 406, it is determined whether a response is required to the message. In one exemplary embodiment, a message can include a control command that causes the processor to perform a function, such as activating an Intel WakeOnLAN Network Interface Card that causes a computer that is off to activate, an inventory scan function that causes the computer to transmit a list of files stored on the computer, a heartbeat query that causes a computer to respond if it is active, or other suitable responses. If it is determined at 406 that a response is not required, the method proceeds to 410. Otherwise, the method proceeds to 408 where a response to sequencing is performed. In one exemplary embodiment, the response to sequencing can include an analysis of the priority in which responses should be received, the bandwidth available between endpoints that will be receiving the response message and the application requiring the response, such as an application distribution system 102, the processing capacity of an application layer gateway or other suitable systems that are used to coordinate transmission of responses to the application, and other suitable constraints or factors. The method then proceeds to 410.

At 410, the bandwidth requirements for the messages are determined. In one exemplary embodiment, bandwidth requirements can be based on total bandwidth required for a group of messages, the bandwidth required at various points and the message transmission path to endpoints, or other suitable bandwidth requirements. The method then proceeds to 412.

At 412, it is determined whether the amount of bandwidth required is greater than available bandwidth. If the amount of bandwidth required is not greater than available, the method proceeds to 416. Otherwise, the method proceeds to 414 where bandwidth sequencing is performed. In one exemplary embodiment, bandwidth sequencing can be performed by using the priority of messages, the priority of endpoints, can be based on an analysis of bottleneck constraints, such as areas in which the bandwidth is a constraint on distribution for other areas, or other suitable factors. The method then proceeds to 416.

At 416, resource requirements are determined for distribution of the messages throughout the enterprise. In one exemplary embodiment, resource requirements can include the processor requirements for receiving and transmitting messages, storing messages, bandwidth requirements, or other suitable resource requirements. The method then proceeds to 418.

At 418, it is determined whether the amount of resources required for distribution of the messages exceeds available resources. If the amount does not exceed available resources, the method proceeds to 422. Otherwise, the method proceeds to 420 where resource sequencing is performed. In one exemplary embodiment, resource sequencing can include ordering messages based upon the priority of the message, based upon the amount of resources required, based upon bottleneck resource constraints, such as areas in which the processor capacity or storage availability will limit the distribution of the messages or other suitable resource sequencing. The method then proceeds to 422.

At 422, it is determined whether any event-based messages are included. If no event-based messages are included, the method proceeds to 426 and terminates. Otherwise the method proceeds to 424 where event based sequencing is performed. In one exemplary embodiment, events can be sequenced based upon priority of the event, a sequence number for events, or other suitable data. The method then proceeds to 426 where the message sequencing is released.

In operation, method 400 allows a plurality of messages including file messages and control data messages to be sequenced so as to allow enterprise distribution of software to be performed over a network. Method 400 uses existing network resources to distribute software from one or more centralized locations to a plurality of endpoints in an efficient manner, so as to optimize available network resources to allow the software to be efficiently distributed.

Figure 5:
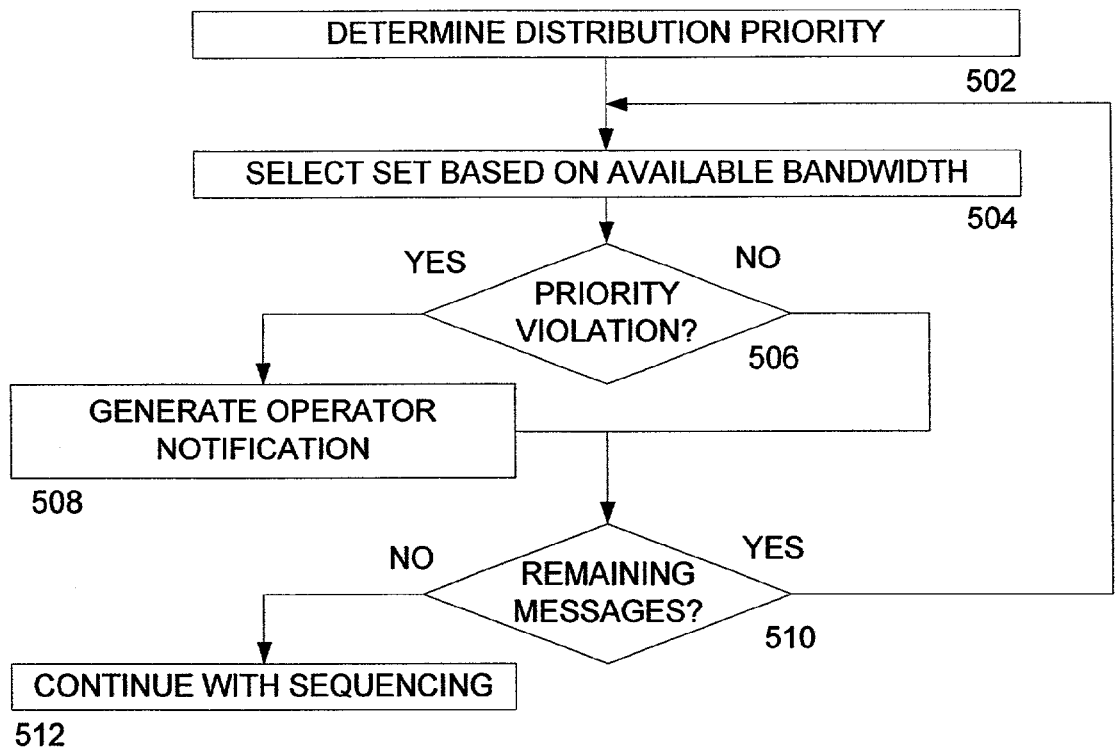
FIG. 5 is a flowchart of a method for performing bandwidth sequencing of messages in accordance with an exemplary embodiment of the present invention.

FIG. 5 is a flowchart of a method 500 for performing bandwidth sequencing of messages in accordance with an exemplary embodiment of the present invention. Method 500 allows a plurality of messages to be sequenced based upon bandwidth requirements in an enterprise software distribution system.

Method 500 begins at 502 where distribution priority is determined. In one exemplary embodiment, distribution priority can be determined based upon the software suite, the software component of a suite, the location of an endpoint, the function of an endpoint, a function that has to be performed by the endpoint, a function that has to be performed by an application layer router or gateway, or other suitable criteria. The method then proceeds to 504.

At 504, a message set is selected based upon the available bandwidth. In one exemplary embodiment, the message set can be selected by taking the highest priority messages in sequence until all available bandwidth has been allocated. In another exemplary embodiment, the message set can be selected based on priority in conjunction with other factors, such as the location of associated endpoints with priority messaging, bandwidth bottlenecks at certain locations, or other suitable functions. The method then proceeds to 506.

At 506, it is determined whether a priority violation has occurred. In one exemplary embodiment, a priority violation can include a sequencing of messages that results in a message not being transmitted at a required time, such as prior to transmission of other messages, in conjunction with transmission of other messages, or at other suitable times. If a priority violation has not occurred, the method proceeds to 510. Otherwise the method proceeds to 508 where operator notification is generated. In one exemplary embodiment, operator notification can request that the operator correct the priority violation, such as by reviewing the messages and selecting an operator override sequence. The method then proceeds to 510.

At 510, it is determined whether any remaining messages need to be sequenced. If messages remain, the method returns to 504. Otherwise, the method proceeds to 512 where sequencing of messages continues, such as response sequencing, resource sequencing, or event sequencing.

In operation, method 500 allows messages to be sequenced based upon available bandwidth so as to optimize message distribution in an enterprise software distribution system. Method 500 allows priority to be assigned to messages so as to ensure that messages are received in a predetermined order, such as messages that may require a response to be generated or other suitable messages.

Figure 6:
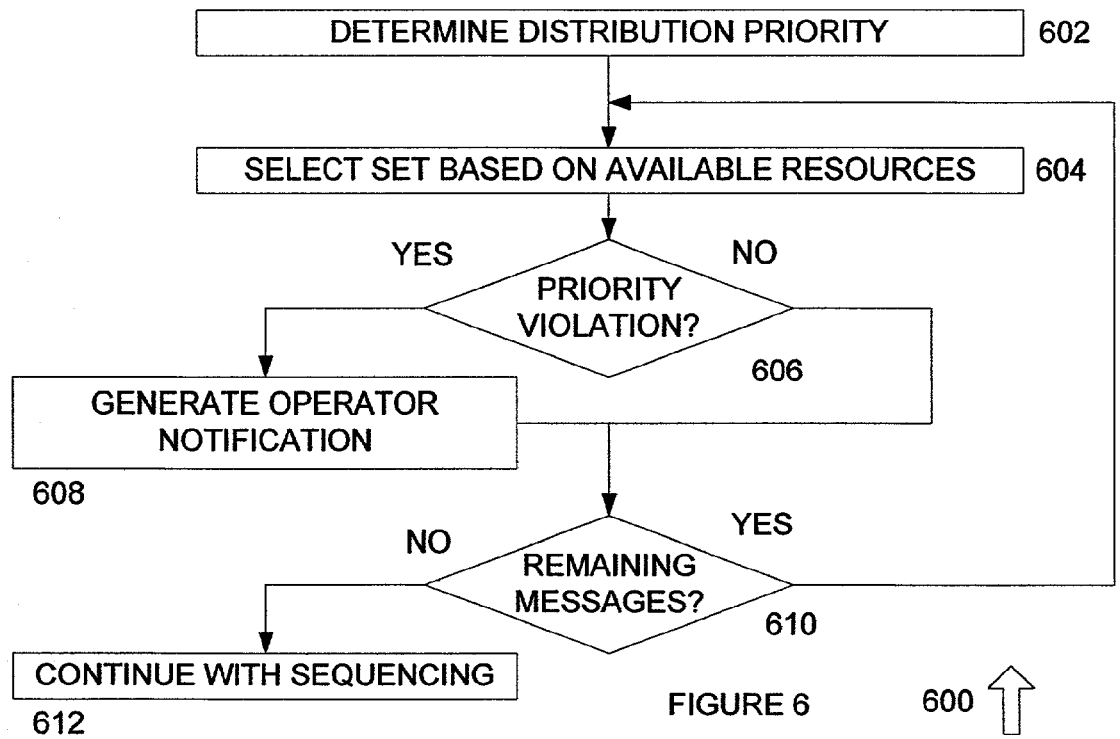
FIG. 6 is a flowchart of a method for performing resource sequencing of messages in accordance with an exemplary embodiment of the present invention.

FIG. 6 is a flowchart of a method 600 for performing resource sequencing of messages in accordance with an exemplary embodiment of the present invention. Method 600 allows a plurality of messages to be sequenced based upon resource requirements in an enterprise software distribution system.

Method 600 begins at 602 where distribution priority is determined. The method then proceeds to 604, where a message set is selected based upon the available resources. In one exemplary embodiment, the message set can be selected based on processor requirements for processing the message, for generating responses, for processing responses, for operating timers, for storing files, processor capacity bottlenecks at certain locations, or other suitable resource sequencing functions. The method then proceeds to 606.

At 606, it is determined whether a priority violation has occurred. If a priority violation has not occurred, the method proceeds to 610. Otherwise the method proceeds to 608 where operator notification is generated. The method then proceeds to 610.

At 610, it is determined whether any remaining messages need to be sequenced. If messages remain, the method returns to 604. Otherwise, the method proceeds to 612 where sequencing of messages continues, such as response sequencing, bandwidth sequencing, event sequencing, or other suitable sequencing.

In operation, method 600 allows messages to be sequenced based upon available resources so as to optimize message distribution in an enterprise software distribution system. Method 600 allows priority to be assigned to messages so as to ensure that messages are received in a predetermined order, such as messages that may require a response to be generated or other suitable messages.

Figure 7:
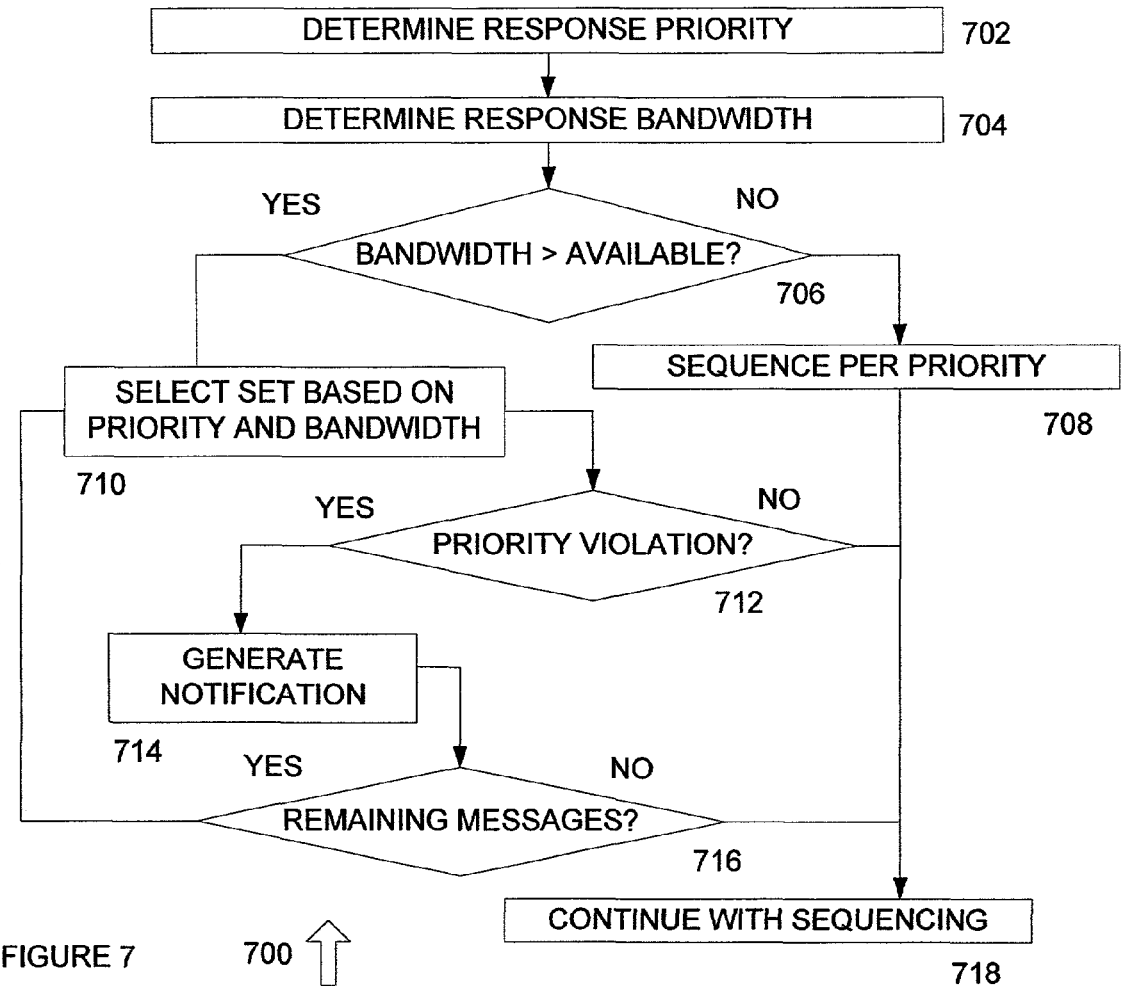
FIG. 7 is a flowchart of a method for performing response sequencing of messages in accordance with an exemplary embodiment of the present invention.

FIG. 7 is a flowchart of a method 700 for performing response sequencing of messages in accordance with an exemplary embodiment of the present invention. Method 700 allows a plurality of messages in an enterprise software distribution system to be sequenced based upon responses that may be generated after the distribution of messages to an endpoint.

Method 700 begins at 702 where a response priority is determined. In one exemplary embodiment, a response priority may be based upon control commands such as execution of an Intel WakeOnLAN Network Interface Card so that a processor is turned on prior to the transmission of messages to that processor. In one exemplary embodiment, the priority of the WakeOnLAN command would be greater than the priority for any other message. After the response priority is determined the method proceeds to 704.

At 704, response bandwidth is determined. In one exemplary embodiment, response bandwidth can include the available bandwidth between a plurality of endpoints and an application layer gateway, such as where the gateway is used to coordinate the transmission of response messages from the endpoints back to an application, such as an application distribution system 102. After the response bandwidth is determined, the method proceeds to 706.

At 706, it is determined whether the bandwidth required for the response is greater than available bandwidth. *In one exemplary embodiment, the bandwidth can be determined based upon maximum response bandwidth required, the response bandwidth required at system bottlenecks, or other suitable bandwidth. If it is determined that the bandwidth is not greater than available, the method then proceeds to* 708, *where the messages are sequenced in accordance with the message priority. Otherwise, the method proceeds to* 710.

At 710, a set of messages is selected based upon priority and bandwidth constraints. In one exemplary embodiment, bandwidth sequencing may have already been performed such that predetermined sets are available for response priority sequencing. In another exemplary embodiment, priority sequencing can be performed in conjunction with bandwidth sequencing, and the transmission sets can be selected based upon overlapping compatible sets. The method then proceeds to 712.

At 712, it is determined whether a priority violation has occurred. If a priority violation has not occurred, the method proceeds to 718. Otherwise, the method proceeds to 714 where a notification is generated requesting operator assistance. The method then proceeds to 716.

At 716, it is determined whether any remaining messages need to be sequenced. If remaining messages are available, the method returns to 710. Otherwise, the method proceeds to 718 where sequencing for other factors is performed, such as resource sequencing or event sequencing.

In operation, method 700 is used to perform response sequencing in an enterprise software distribution system, so as to prevent responses that may be generated following transmission of messages including files or control data from overloading system capacity. In this manner, system 700 prevents data loss from occurring, such as from undelivered messages, which can result in improper installation of files in an enterprise software distribution system.

Figure 8:
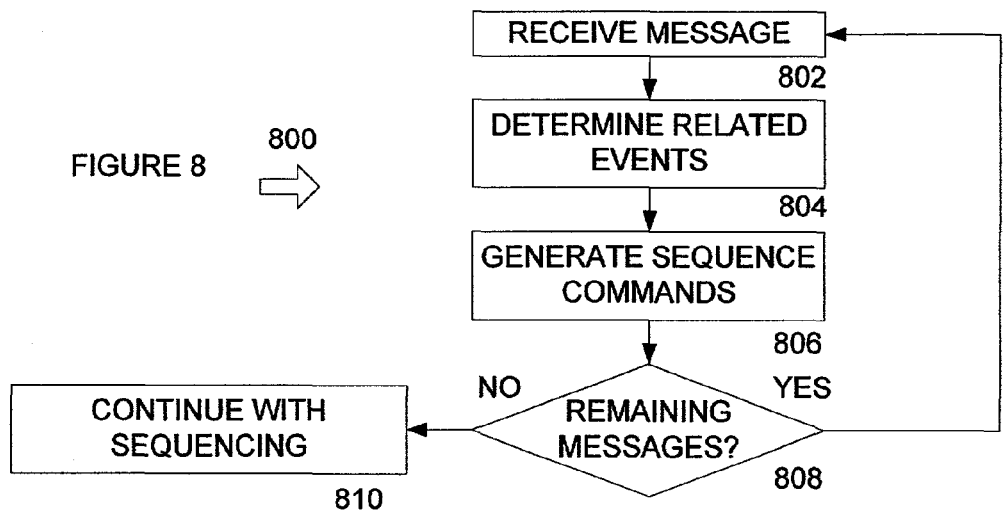
FIG. 8 is a flowchart of a method for performing event-based sequencing of messages for an enterprise software distribution system in accordance with an exemplary embodiment of the present invention.

FIG. 8 is a flowchart of a method 800 for performing event-based sequencing of messages for an enterprise software distribution system in accordance with an exemplary embodiment of the present invention. Method 800 begins at 802 where a message is received. In one exemplary embodiment, the message can include file data, control data or other suitable data that identifies a message transmission route, a message transmission endpoint, functional requirements, or other suitable data. The method then proceeds to 804.

At 804, it is determined whether there are any related events required for the message. In one exemplary embodiment, installation of components, bandwidth availability, processor availability, or other suitable events may need to occur before a message is transmitted, such as to prevent inadvertent non-delivery of the message, to ensure that predetermined events occur prior to transmission of the message, or for other suitable purposes. The method then proceeds to 806.

At 806, sequence commands are generated. In one exemplary embodiment, message sequencing can be generated based upon relative events, such that messages are sequenced after all messages have been processed. In another exemplary embodiment, messages can be assigned a sequence based upon absolute events, such as transmission of a message after a processor is on, transmission of a message after an operating system has been installed, or other suitable events. The method then proceeds to 808.

At 808, it is determined whether remaining messages need to be sequenced for event related sequencing. If any messages are remaining, the method returns to 802. Otherwise, the method proceeds to 810 where the process continues with any remaining sequencing, such as bandwidth sequencing, response sequencing, or resource sequencing.

In operation, method 800 allows messages to be sequenced based upon events that may be required prior to transmission of a message. Method 800 thus allows modified publish and subscribe messaging to be used in an enterprise software distribution system so as to allow the address of an endpoint to be determined centrally and for the message to be sequenced to the endpoint without inadvertent receipt of a message prior to predetermined events.

FIGS. 9 through 14 relate to an exemplary embodiment of the present invention that can be used to manage a software supply chain to a large number of workstations. In one exemplary embodiment, three different types of nodes can be used. The first node can be referred to as a message oriented application server (MOAS) or central server where software is assembled into components and suites. This node can be the starting point for all software distributions. This node can also maintain a profile of workstations that are being managed for the purpose of software distribution and configuration changes. A second node can be a mid-tier server (MTS), where the invention employs a hierarchy of MTS nodes for distribution of software and control messages. The third node can be referred to as an endpoint, and can be the recipient of software distributions and configuration change events initiated at the MOAS node.

The present invention can use a multi-tiered approach where control messages and file data are distributed to endpoints in a tiered fashion so as to have minimal impact on an enterprise's network and processing resources. Endpoint nodes can receive software distributions and other control messages that originate from a MOAS node through a hierarchy of MTS nodes. Response messages from the endpoints can be delivered to a MOAS node through the MTS nodes. A multi-tiered approach can also be used to facilitate local administrative control over MTS nodes.

In one exemplary embodiment, an enterprise is geographically divided into several regions, where each of the regions can have sub-regions. Using a tiered approach, the MOAS node and a top level MTS node (MASTER-MTS) can be located at a corporate headquarters, a plurality of second tier MTS nodes can be located one at each of a plurality of regional offices, and a plurality of third tier MTS nodes can be located one at each of a plurality of sub-regions. Endpoints can be located at the sub-regions and can receive control and file data from the sub-regional MTS nodes.

In this exemplary embodiment, MTS nodes at any given tier can move the control and file data messages downstream if there is an interest in those messages by endpoints located below them in the hierarchy, such that a software distribution targeted for endpoints that belong to a particular sub-region will not affect other regions or sub-regions of the enterprise.

A distribution cycle can begin at an MOAS node after a component or a suite of components have been packaged and a set of endpoints have been identified to receive them. In this exemplary embodiment, two types of distributions can be used—staged and non-staged. The main phases of a distribution cycle for both types of distributions can include:

Selected endpoints are notified of a component change event by a MOAS node (Downstream Messaging)
Endpoints interested in the distribution, request their local MTS node to distribute a list of files that make up a component (Depot request)
MTS nodes wait for more distribution requests from other endpoints for a given file. (Depot request)
MTS nodes distribute all requested files from its software vault. (Depot/File Transfer)
Endpoint installs the software component. (Installer)
Endpoint sends back a response to the MOAS node about the distribution/installation status through its MTS node (Upstream Messaging)

For non-staged distribution, an MTS node might not have the files requested by lower level nodes (endpoints or lower level MTS nodes). In this case the MTS node can first retrieve these files from its parent MTS node in the hierarchy and can then satisfy the requests from lower level nodes.

For staged distribution, the necessary files for a given software component can be staged at all the MTS nodes that lie in the path of endpoints selected for the distribution before the Component Change event from the MOAS node reaches the endpoints. In one exemplary embodiment, this can be achieved through an event based forwarding mechanism in the Downstream Messaging System (Router).

Figure 9:
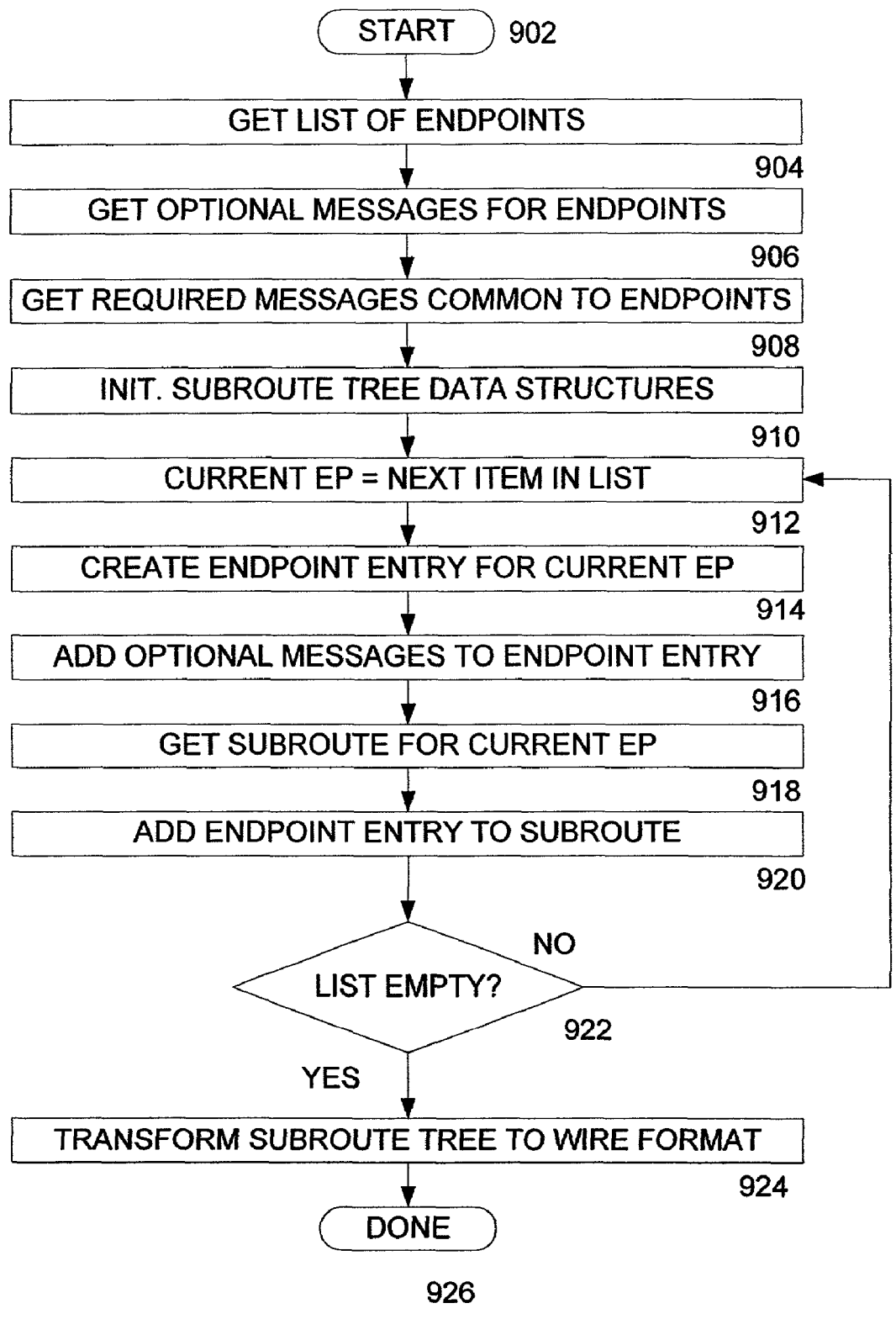
FIG. 9 is a flowchart of a method for a "build routed message" process in accordance with an exemplary embodiment of the present invention.

FIG. 9 is a flowchart of a method 900 for a "build routed message" process in accordance with an exemplary embodiment of the present invention. The build routed message process can be executed on a central server. A message can be sent to a group of endpoints in an enterprise using method 900 by first building a routed message and sending it to a master router running on a master mid-tier server. The build routed message process allows required messages to be specified that can be delivered to all endpoints in a list as well as optional messages to be specified that can be delivered to specific endpoints.

Method 900 begins at 902 and proceeds to 904 where a list of end points is obtained. The method then proceeds to 906 where optional messages are obtained for the end points. The method then proceeds to 908 where required messages common to the end points are obtained. The method then proceeds to 910.

At 910, subroute tree data structures are initialized. The method then proceeds to 912 where the current end point is set equal to the next item in the list. The method then proceeds to 914 where an end point entry is created for the current end point. The method then proceeds to 916 where optional messages are added to the end point entry. The method then proceeds to 918 where a subroute is obtained for the current end point. The method then proceeds to 920 where an end point entry is added to the subroute. The method then proceeds to 922.

At 922, it is determined whether the list is empty. If the list is not empty, the method returns to 912. Otherwise, the method proceeds to 924 where the subroute tree is transformed to a wire format that is suitable for transmission over the network. An exemplary wire format is XML. The method then proceeds to 926 and completes.

Figure 10:
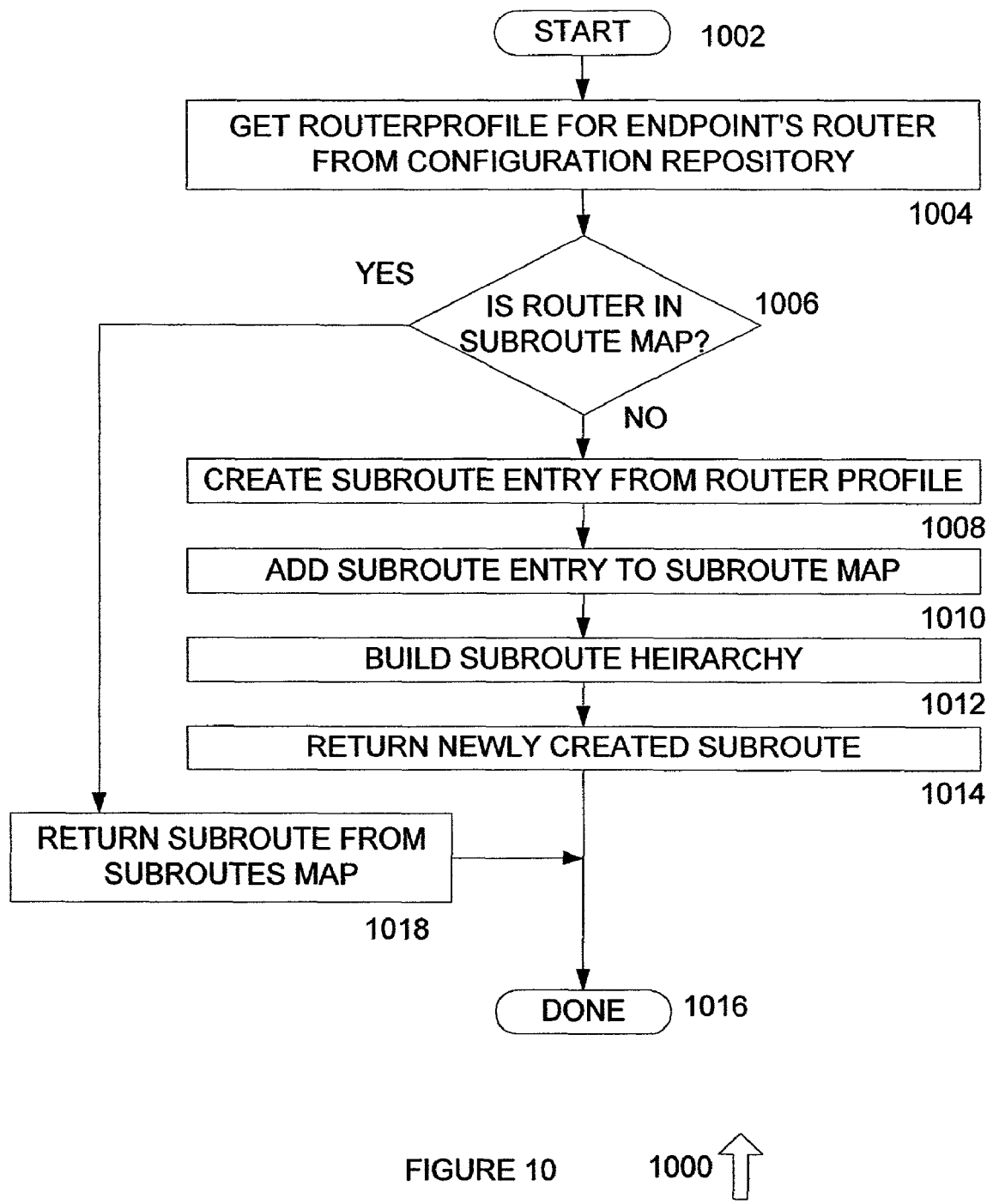
FIGS. 10 and 11 are flowcharts of methods that are used in conjunction with a method to build a sub-route tree data structure in accordance with an exemplary embodiment of the present invention.
Figure 11:
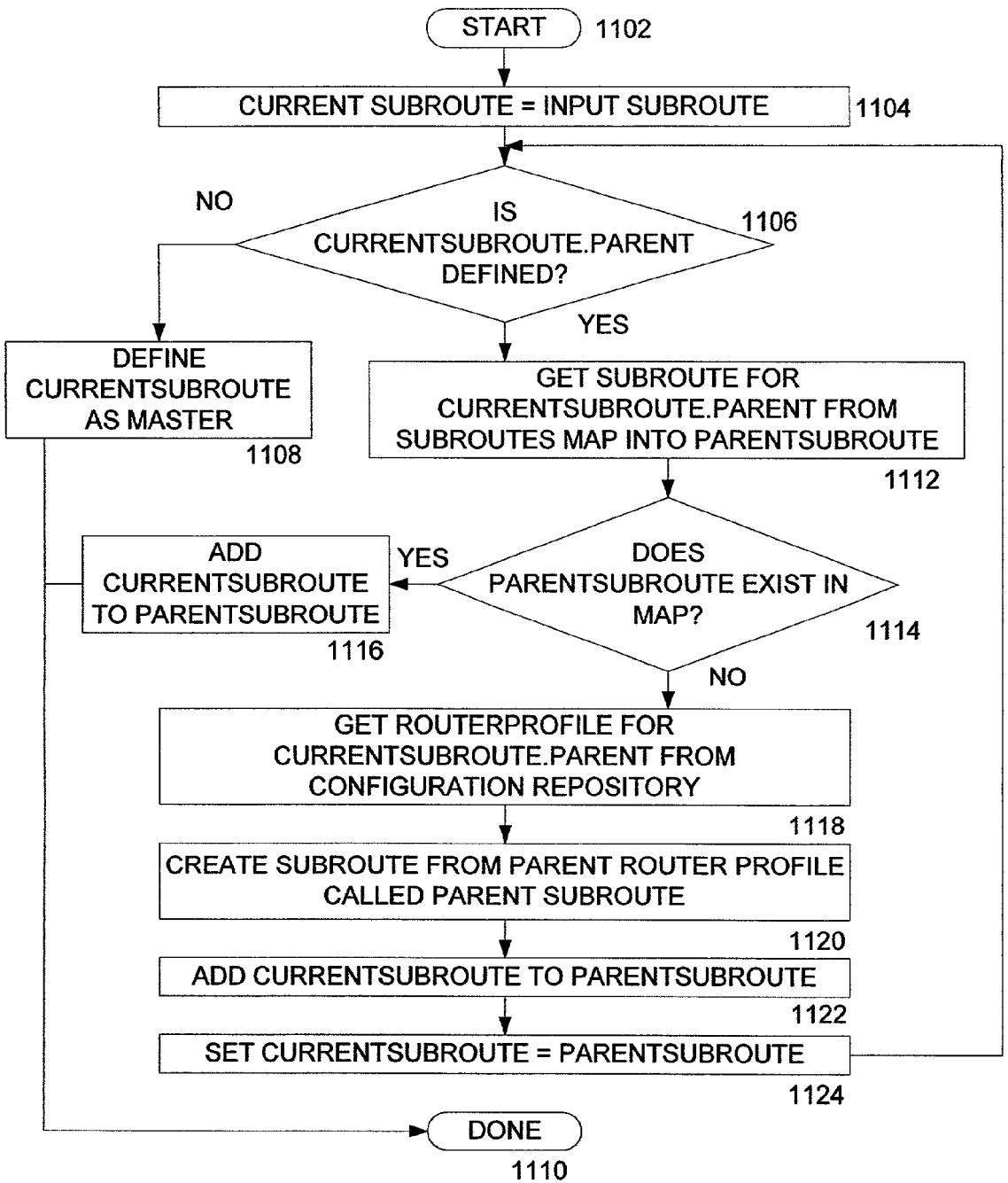

FIGS. 10 and 11 are flowcharts of methods 1000 and 1100, respectively, that are used in conjunction with method 900 to build a sub-route tree data structure in accordance with an exemplary embodiment of the present invention. The term 'Router Profile' in these flowcharts refers to the information stored about a router in a configuration repository. Each workstation node in the repository is associated with one or more midservers. The configuration repository generates midserver identification data for a given workstation and a given service in response to a request. The Router Profile includes the hostname of the router and the hostname of its parent in the mid-tier server hierarchy.

Method 1100 traverses up the mid-tier server hierarchy in the Configuration Repository for a given router and builds a subroute tree data structure all the way up to a master router, which is a router that does not have a parent.

Method 1000 is a "get subroute for endpoint" process that begins at 1002 and proceeds to 1004 where router profile data for an end point's router is obtained from the configuration repository. The method then proceeds to 1006 where it is determined whether the router is in the subroute map. If the router is not in the subroute map, the method proceeds to 1008 where a subroute entry is created from the router profile. The method then proceeds to 1010 where the subroute entry is added to the subroute map. The method then proceeds to 1012 where the subroute hierarchy is built. The method then proceeds to 1014 where a newly created subroute is returned. The method then proceeds to 1016 and terminates. Likewise, if it is determined at 1006 that the router is in a subroute map, the method proceeds to 1018 where the route subroute from the subroute's map is returned and the method proceeds to 1016 and terminates.

Method 1100 is a "build subroute hierarchy for given subroute" process that begins at 1102 and proceeds to 1104 where a current subroute is set equal to an input subroute. The method then proceeds to 1106 where it is determined whether a current subroute.parent is defined. If the current subroute-.parent is not defined the method proceeds to 1108 where a current subroute is defined as the master and the method proceeds to 1110 and terminates. Likewise, if it is determined at 1106 that a current subroute.parent is defined, the method proceeds to 1112 where a subroute is obtained for the current subroute.parent from a subroute's map into the parent subroute. The method then proceeds to 1114.

At 1114, it is determined whether a parent subroute exists on the map. If a parent subroute exists on the map, the method proceeds to 1116 and the current subroute is added to the parent subroute. The method then proceeds to 1110 and terminates. Likewise, if it is determined at 1114 that a parent subroute does not exist in the subroute in the map, the method proceeds to 1118 where router profile is obtained for a current subroute.parent from the configuration repository. The method then proceeds to 1120 where a subroute is created from the parent router profile called parent subroute. The method then proceeds to 1122 where a current subroute is added to a parent subroute. The method then proceeds to 1124 where a current subroute is set equal to a parent subroute. The method then returns to 1106.

Figure 12:
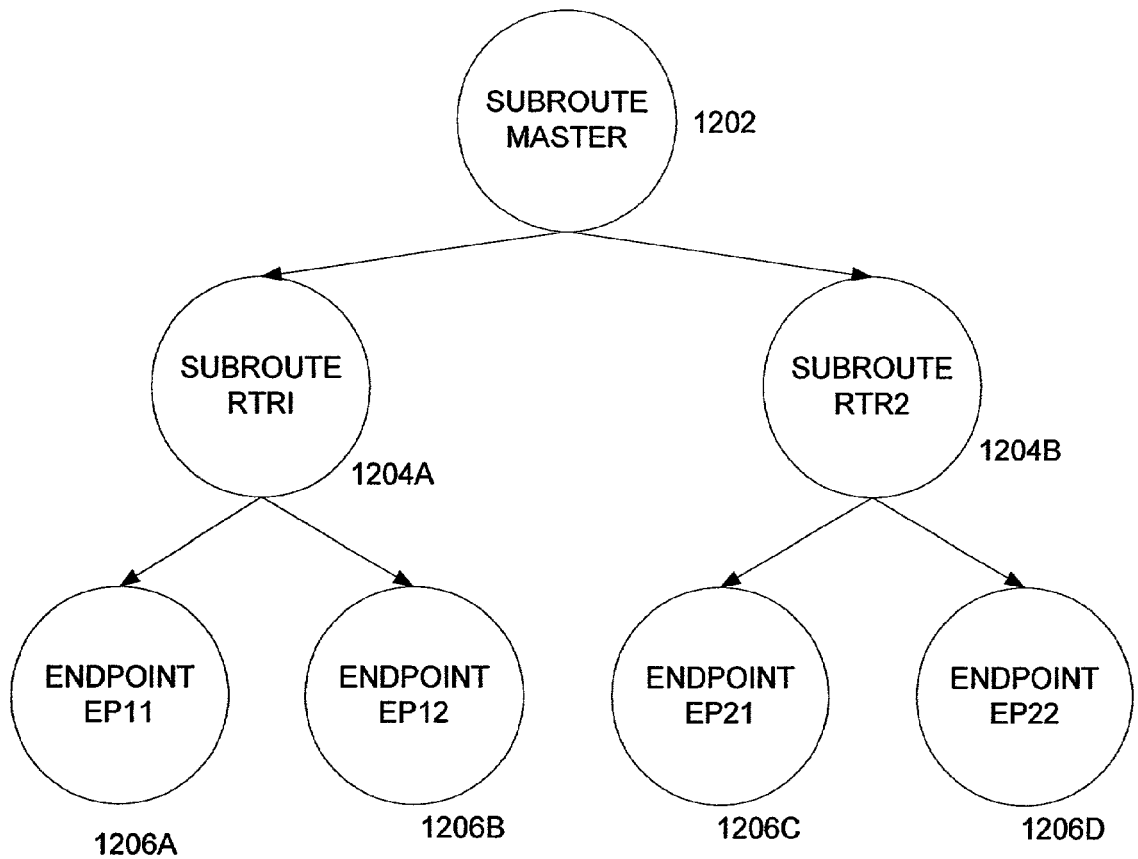
FIG. 12 is a diagram of an exemplary subroute tree data structure.

FIG. 12 is a diagram 1200 of exemplary subroute tree data structure that can be built by the build routed message process. A subroute map is used for locating a subroute data structure given the name of the router. In one exemplary embodiment, this process can be implemented using a hash map. Diagram 1200 includes subroute master 1202, subroute routers 1204(*a*) and 1204(*b*), and endpoints 1206(*a*) through 1206(*d*). Table 1208 is an exemplary XML formatted routed messages corresponding to the subroute tree data structure of diagram 1200, which can be sent to the master router. Table 1210 and 1212 are exemplary XML routed messages that can be published by routers named 'Master' and 'RTR1' respectively that correspond to the subroute data structure of diagram 1200.

Figure 13:
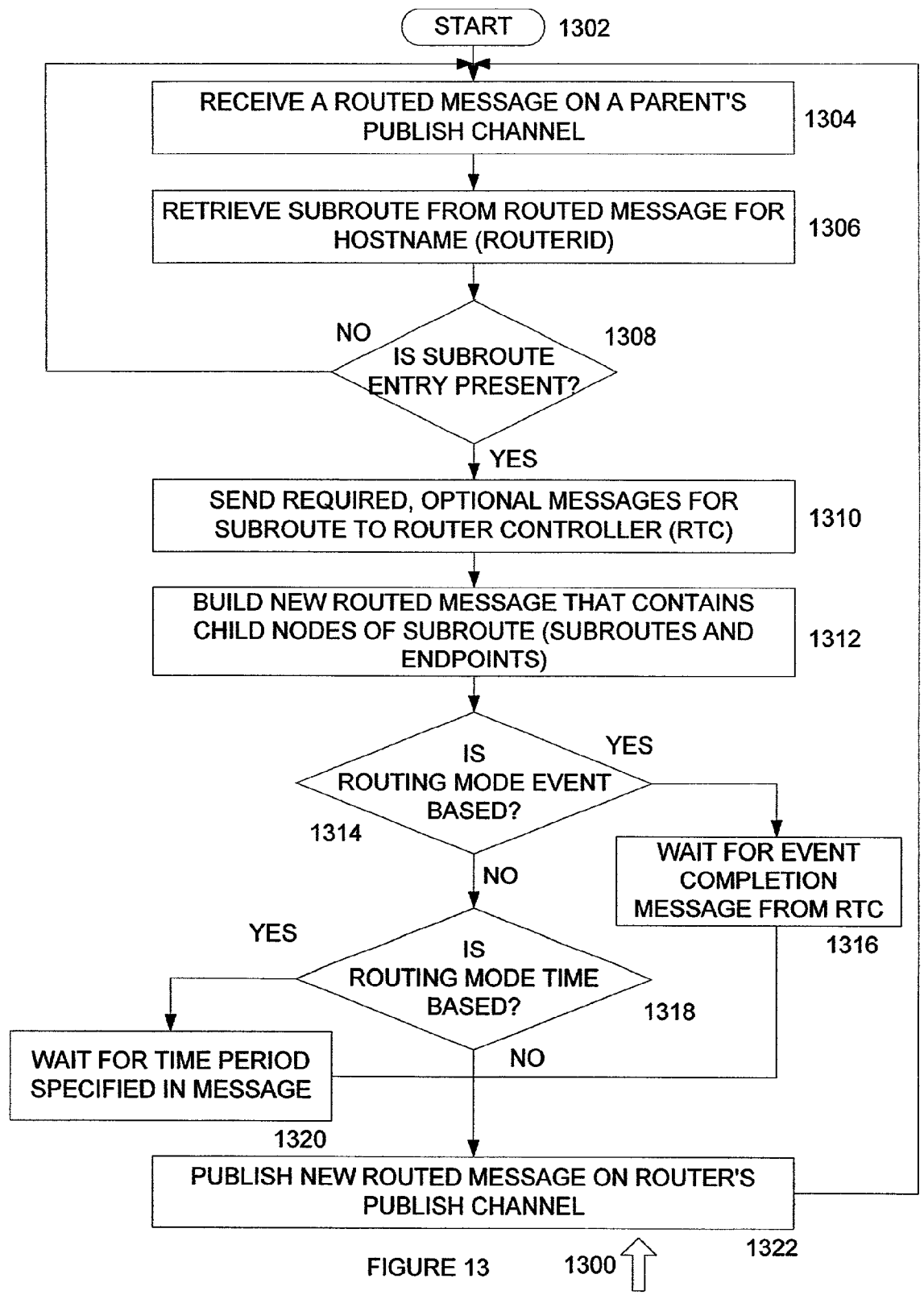
FIG. 13 is a flowchart of a method of an exemplary routing algorithm executed by a router service running on a mid-tier server.

FIG. 13 is a flowchart of a method 1300 of an exemplary routing algorithm executed by a router service running on a mid-tier server. Routers and endpoints can receive routed messages from a corresponding parent on the parent's published channel using a 'restricted subscription' process. Routers publish routed messages on a unique channel called as the router published channel. In one exemplary embodiment, the Master Router can use a dedicated channel because it does not have a parent. In one exemplary embodiment, method 1300 can be executed by concurrently running threads for optimization. A single routed message can be processed by different threads at various stages of the flowchart.

Method 1300 begins at 1302 and proceeds to 1304 where a routed message is received on a parent's published channel. The method then proceeds to 1306 where the subroute is retrieved for a routed message from a host name (router ID). The method then proceeds to 1308.

At 1308 it is determined whether a subroute entry is present. If a subroute entry is not present, the method returns to 1304. Otherwise the method proceeds to 1310 where required and optional messages are sent for a subroute to a router controller. The method then proceeds to 1312 where a new routed message is built that contains child nodes of the subroute (subroutes and end points). The new routed message is saved and an acknowledgement is sent to the parent. To conserve network bandwidth, transmission of the acknowledgement can be delayed and the acknowledgement can be grouped with other acknowledgements. In order to protect against router outages the new routed message is first saved and then deleted when acknowledgements are received from all subscribers listed in the new routed message. The method then proceeds to 1314.

At 1314, it is determined whether a routing mode is event-based. If the routing mode is event-based, the method proceeds to 1316 where the method waits for an event completion message from the router controller. The method then proceeds to 1322 where the new routed message is published on the router published channel. The new routed message can be re-published if acknowledgements are not received from all subscribers within a predetermined time period. The method then returns to 1304. Likewise, if it is determined at 1314 that the routing mode is not of event-based, the method proceeds to 1318 where it is determined whether the routing mode is time-based. If the routing mode is not time-based, the method proceeds to 1322. Otherwise, the method proceeds to 1320 where the method waits for a time period specified in the message. The method then proceeds to 1322.

Figure 14:
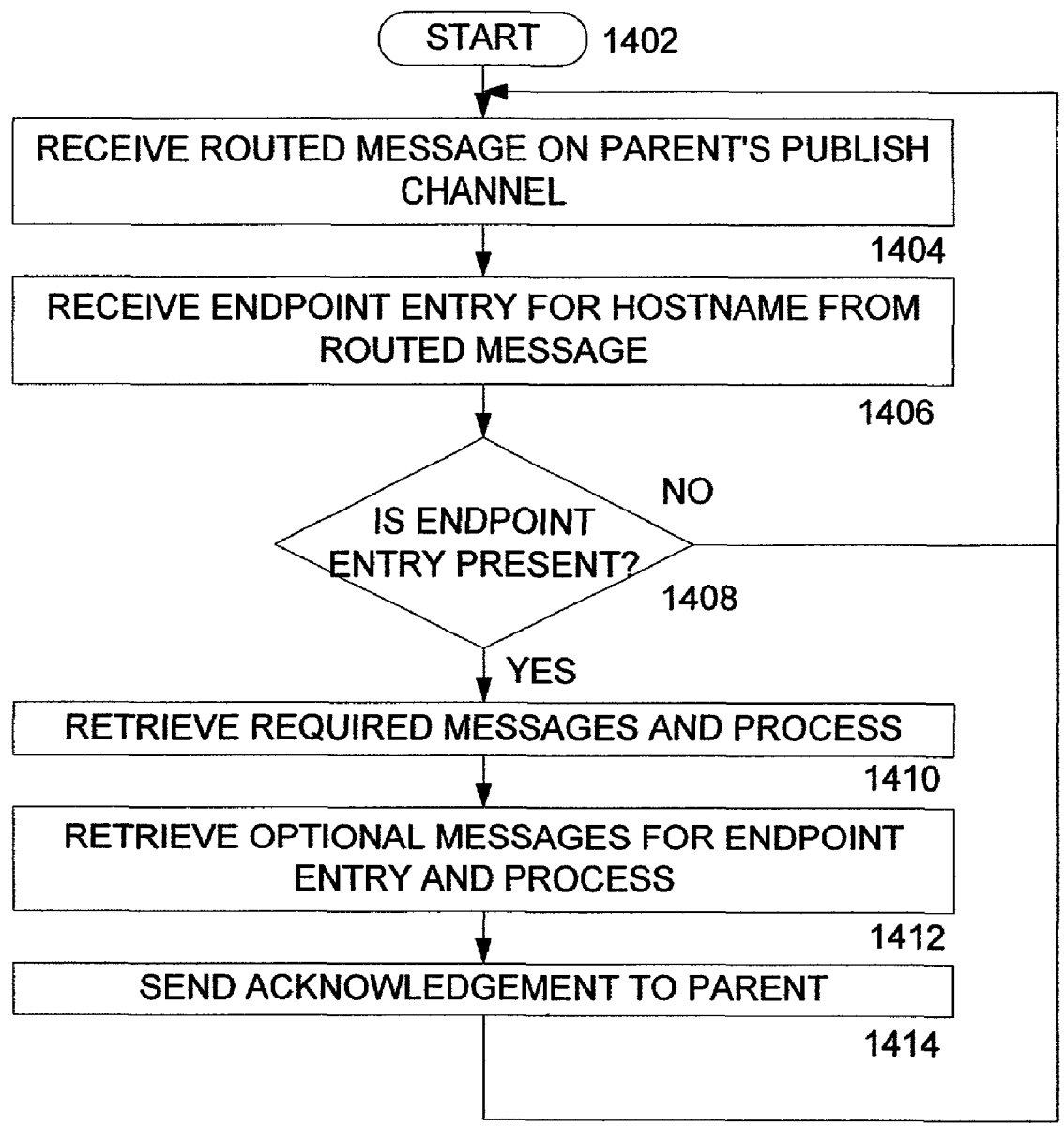
FIG. 14 is a flowchart of a method for processing a routed message by an endpoint.

FIG. 14 is a flowchart of a method 1400 for processing a routed message by an endpoint. In one exemplary embodiment, method 1400 can be performed at all endpoints in the enterprise that are to be notified by applications running on the central server.

Method 1400 begins at 1402 and proceeds to 1404 where a routed message is received on a parent's published channel. The method then proceeds to 1406 where an end point entry for the endpoint's host name is received from a routed message. The method then proceeds to 1408.

At 1408 it is determined whether an end point entry is present. If an end point entry is not present the method returns to 1404. Otherwise the method proceeds to 1410 where required messages are retrieved and processed. The method then proceeds to 1412 where optional messages for end point entries are retrieved and processed. The method then proceeds to 1414 where an acknowledgement is sent to the parent. To conserve network bandwidth, transmission of the acknowledgement can be delayed and the acknowledgement can be grouped with other acknowledgements.

Although exemplary embodiments of a system and method for performing the present invention have been described in detail herein, those skilled in the art will also recognize that various substitutions and modifications can be made to the systems and methods without departing from the scope and spirit of the appended claims.

What is claimed is:

1. A method for distributing software comprising:
    distributing a message from an application server to one or more application layer routers through one or more first channels selected front a first channel layer, wherein the message is distributed to the one or more application layer routers in response to at least the one or more application layer routers registering with the application server to receive messages in accordance with configuration data of one or more endpoints; and
    distributing the message from the one or more application routers to the one or more endpoints through one or more second channels selected from a second channel layer, wherein the message is distributed to the one or more endpoints in response to at least the one or more endpoints registering with the one or more application layer routers to receive messages in accordance with the configuration data of the one or more endpoints.

2. The method of claim 1 wherein distributing the message to the endpoint further comprises:
    distributing the message to one or more secondary application layer routers through one or more second channels selected from a second channel layer; and
    distributing the message to the endpoint through one or more third channels selected from a third channel layer.

3. The method of claim 1 wherein the first channel and the second channel are selected by the application server.

4. The method of claim 1 wherein the first channel and the second channel are selected by the application server based on the available data communications bandwidth in one of the first channels or one of the second channels.

5. The method of claim 1 wherein the first channel and the second channel are selected by the application server based on the available data processing capacity of the selected application layer router.

6. The method of claim 1 wherein distributing the message to the endpoint further comprises:
    storing the message at the selected application layer router; and
    distributing the message to the endpoint through one or more second channels selected from the second channel layer alter the occurrence of a predetermined event.

7. The method of claim 6 wherein the predetermined event is one or more of the group comprising an expiration of a timer, receipt of an event occurrence message, receipt of a bandwidth availability message, and receipt of a processor capacity availability message.

8. The method of claim 1 further comprising determining a sequence for the message prior to distributing the message from the application server to one or more application layer routers.

9. The method of claim 8 wherein determining the sequence composes determining the sequence base on one or more or the group comprising data communications bandwidth availability between the application server and the endpoint, processing capacity of one or more of the application layer routers, processing capacity of a gateway receiving messages from the endpoint and the application server, and data communications bandwidth availability between the endpoint and the gateway.

10. The method of claim 1 further comprising:
    generating a response to the message at the endpoint; and
    transmitting the response to a destination system using an application layer gateway.

11. A system for distributing software comprising:
    a memory;
    an application server transmitting a message that includes a first channel selected from a first channel layer and a second channel selected from a second channel layer;
    a first application layer router coupled to the first channel layer receiving the message and transmitting the message over the first channel, wherein the message is distributed to the first application layer router in response to at least the first application layer router registering with the application server to receive messages in accordance with configuration data of at least a first endpoint;
    a second application layer router coupled to the second channel layer receiving the message and transmitting the message over the second channel, wherein the message is distributed to the second application layer router in response to at least the second application layer router registering with the application server to receive messages in accordance with configuration data of at least a second endpoint; and
    the second endpoint receiving the message from the second channel layer.

12. The system of claim 11 wherein the application server further comprises a bandwidth allocation system transmitting the message.

13. The system of claim 11 wherein the application server further comprises an event based sequencing system transmitting the message.

14. The system of claim 11 wherein the first application layer muter further comprises a muter controller storing the message prior to transmitting the message over the first channel.

15. The system of claim 14 wherein the router controller further comprises a message timing system storing the message for a predetermined period of time.

16. The system of claim 14 wherein the router controller further comprises an event based message system storing the message until the occurrence of a predetermined event.

17. The system of claim 11 further comprising a gateway receiving response data from the endpoint generated in response to the message.

* * * * *

UNITED STATES PATENT AND TRADEMARK OFFICE
CERTIFICATE OF CORRECTION

PATENT NO. : 8,166,185 B2  
APPLICATION NO. : 10/092181  
DATED : April 24, 2012  
INVENTOR(S) : Subodh A. Samuel et al.

Page 1 of 1

It is certified that error appears in the above-identified patent and that said Letters Patent is hereby corrected as shown below:

In column 17, line 24, in Claim 1, delete "front" and insert -- from --, therefor.

In column 17, line 61, in Claim 6, delete "alter" and insert -- after --, therefor.

In column 18, line 9, in Claim 9, delete "composes" and insert -- comprises --, therefor.

In column 18, line 10, in Claim 9, delete "or" and insert -- of --, therefor.

In column 18, line 50, in Claim 14, after "layer" delete "muter" and insert -- router --, therefor.

In column 18, line 50, in Claim 14, after "a" delete "muter" and insert -- router --, therefor.

Signed and Sealed this  
Twenty-seventh Day of November, 2012

David J. Kappos  
*Director of the United States Patent and Trademark Office*